(12) United States Patent
Kaicker

(10) Patent No.: US 11,291,296 B2
(45) Date of Patent: Apr. 5, 2022

(54) BRUSH FIBERS WITH CRYSTAL-INFUSED COATING

(71) Applicant: Anisa International, Inc., Atlanta, GA (US)

(72) Inventor: Anisa Telwar Kaicker, Atlanta, GA (US)

(73) Assignee: Anisa International, Inc., Atlanta, GA (US)

( * ) Notice: Subject to any disclaimer, the term of this patent is extended or adjusted under 35 U.S.C. 154(b) by 336 days.

(21) Appl. No.: 16/438,911

(22) Filed: Jun. 12, 2019

(65) Prior Publication Data

US 2019/0387872 A1    Dec. 26, 2019

Related U.S. Application Data

(60) Provisional application No. 62/689,492, filed on Jun. 25, 2018.

(51) Int. Cl.
*A46D 1/00* (2006.01)
*A46B 9/02* (2006.01)
*B32B 9/04* (2006.01)
*B32B 27/36* (2006.01)

(52) U.S. Cl.
CPC .............. *A46D 1/02* (2013.01); *A46B 9/021* (2013.01); *A46B 2200/1046* (2013.01); *B32B 9/048* (2013.01); *B32B 27/36* (2013.01); *B32B 2274/00* (2013.01); *B32B 2391/00* (2013.01)

(58) Field of Classification Search
CPC .... A46B 1/00; A46B 9/021; A46B 2200/1046
See application file for complete search history.

(56) References Cited

U.S. PATENT DOCUMENTS

| | | | |
|---|---|---|---|
| 5,432,000 A * | 7/1995 | Young, Sr. | A61F 13/15658 428/372 |
| 5,460,883 A | 10/1995 | Barber, Jr. et al. | |
| 6,270,895 B1 * | 8/2001 | Needham | A46D 1/00 428/372 |
| 2004/0180202 A1 | 9/2004 | Lawton et al. | |
| 2015/0017888 A1 | 1/2015 | Idzko et al. | |
| 2017/0265637 A1 | 9/2017 | Telwar | |

FOREIGN PATENT DOCUMENTS

| JP | 6184545 | 8/2017 |
|---|---|---|
| WO | 2020005661 | 1/2020 |

OTHER PUBLICATIONS

Kaicker, Anisa Telwar; International Preliminary Report on Patentability for PCT Application No. PCT/US19/38791, filed Jun. 19, 2019, dated Jan. 7, 2021, 9 pgs.
Kaicker, Anisa Telwar; International Search Report and Written Opinion for PCT Application No. PCT/US19/38791, filed Jun. 19, 2019, dated Aug. 22, 2019, 10 pgs.

* cited by examiner

*Primary Examiner* — Michael D Jennings
(74) *Attorney, Agent, or Firm* — Taylor English Duma LLP

(57) ABSTRACT

Example aspects of a mixture for coating a brush fiber, a cosmetic brush, and a method for manufacturing a coated brush fiber are disclosed. The method for manufacturing a coated brush fiber can comprise idling an uncoated brush fiber in a mixer containing crystal particles; introducing a resin into the mixer; heating and agitating the resin and crystal particles within the mixer to form a mixture; and coating the uncoated brush fiber with the mixture to form a coated brush fiber.

11 Claims, 2 Drawing Sheets

BRUSH FIBERS WITH CRYSTAL-INFUSED COATING

CROSS-REFERENCE TO RELATED APPLICATIONS

The present application claims priority to U.S. Provisional Application No. 62/689,492, filed Jun. 25, 2018, which is hereby specifically incorporated by reference herein in its entirety.

TECHNICAL FIELD

This disclosure relates to cosmetic brushes. More specifically, this disclosure relates to cosmetic brushes infused with particles having beneficial skincare properties.

BACKGROUND

Cosmetic brushes are used for applying cosmetics (e.g., makeup, moisturizers, serums, etc.) to the skin of a user, and often to facial skin. Cosmetic brushes commonly comprise a brush head and a handle. A typical brush head can comprise a plurality of brush fibers attached to a handle directly or indirectly. Cosmetics can be manually applied to the skin and the plurality of brush fibers can be rubbed against the skin to spread and blend the cosmetics into the skin.

Brush fibers and/or particles of the brush fibers of an undesirable size or texture can penetrate and/or irritate the skin of a user, causing discomfort and/or skin problems, particularly for user's with sensitive skin. Further, cosmetic brushes can gather bacteria and can become unsanitary. Using an unsanitary cosmetic brush can transfer the bacteria to the user's skin.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a cosmetic brush comprising a brush body; and a plurality of brush fibers extending from the brush body, the brush fibers coated with a mixture, the mixture comprising; a resin; and particles each defining a diameter of at least about 6.5 μm and comprising beneficial skincare properties.

Also disclosed is a mixture for coating a brush fiber, the mixture comprising a resin of about 96 weight percent; a dispersing agent of about 3 weight percent; and a plurality of crystal particles, the crystal particles of about 1 weight percent.

Also disclosed is a method for manufacturing a coated brush fiber, the method comprising idling an uncoated brush fiber in a mixer containing crystal particles; introducing a resin into the mixer; heating and agitating the resin and crystal particles within the mixer to form a mixture; and coating the uncoated brush fiber with the mixture to form a coated brush fiber.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
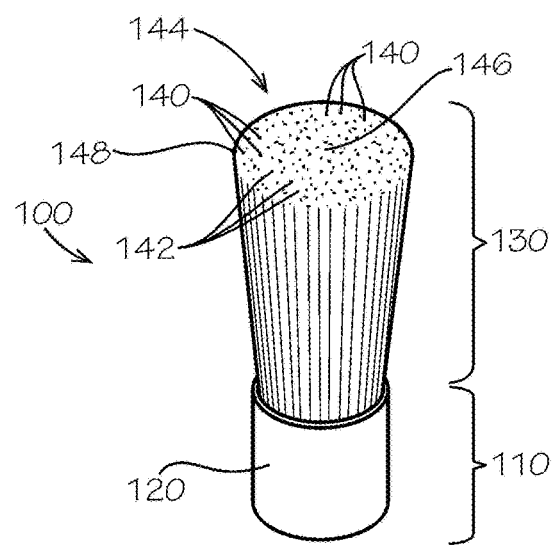
FIG. 1 shows a top perspective view of a cosmetic brush comprising a cosmetic brush comprising a plurality of brush fibers, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed, it is understood that each of these additional steps can be performed with any specific aspect or combination of aspects of the disclosed methods.

Disclosed in the present application is a cosmetic brush and associated methods, systems, devices, and various apparatus. Example aspects of the cosmetic brush can comprise a brush body and a brush head coupled to the brush body. The brush head can comprise a plurality of brush fibers coated and/or infused with a mixture comprising particles having beneficial skincare properties. For example, the particles can be crystal particles. It would be understood by one of skill in the art that the disclosed cosmetic brush is described in but a few exemplary aspects among many. No particular terminology or description should be considered limiting on the disclosure or the scope of any claims issuing therefrom.

FIG. 1 illustrates a first aspect of a cosmetic brush 100 according to the present disclosure. As shown, the cosmetic brush 100 can comprise a brush body 110 and a brush head 130 comprising a plurality of brush fibers 140, as shown, bristles, or hair. In example aspects, the brush body 110 can comprise a ferrule 120. According to some example aspects, the ferrule 120 can comprise grooves (not shown) for receiving a proximal end (not shown) of each of the brush fibers 140, and may further utilize a fastener, such as, for example, an adhesive, such as glue, for securing the brush fibers 140 within the grooves. In other aspects, the brush fibers 140 may be secured to the brush body 110 by any other suitable fastener known in the art. As shown, each of the brush fibers 140 can further define a free end 142 distal to the ferrule 120. According to example aspects, the free ends 142 of the brush fibers 140 can define an application end 144 of the brush head 130.

Example aspects of the ferrule 120 can be formed from a metal material. Other example aspects of the ferrule 120 can be formed from a plastic material, or any other suitable material known in the art or combination thereof. In some aspects of the cosmetic brush 100, a handle 350 (shown in FIG. 3) can be attached to the ferrule 120. The handle can be configured to be manually gripped by a user during the application of cosmetics (e.g., liquid makeup, serums, lotions, etc.), as will be described in further detail below. According to other aspects, the cosmetic brush 100 may not comprise the handle 350, and can comprise the ferrule 120 only, which can also function as the handle 350. In still other aspects, the cosmetic brush 100 may not comprise the ferrule 120, and the brush head 130 can be directly attached to the handle 350. Example aspects of the ferrule, such as the ferrule illustrated in FIG. 1, can define a substantially circular cross-sectional shape, as shown; however, other aspects of the ferrule can define any other suitable cross-sectional shape, including, but not limited to, rectangular, triangular, oval, and the like.

Example aspects of the brush fibers 140 can be comprise a flexible material, including, but not limited to, polyester, nylon, plastic, or any other suitable material. The brush fibers 140 can be cut to a desired thickness and can be coated and/or infused with a mixture 200 (shown in FIG. 2) during the manufacturing process, as described in further detail below. In the present aspect, each of the brush fibers 140 can define a substantially circular cross-sectional shape; however, in other aspect, the brush fibers 140 can define a different cross-sectional shape, such as triangular, quadrangular, or any other suitable cross-sectional shape known in the art. Furthermore, in the present aspect, the brush head 130 as a whole can define a substantially circular cross-sectional shape, though other aspects of the brush head 130 can define any other suitable cross-sectional shape known in the art, including triangular, rectangular, or any other regular or irregular shape.

According to example aspects, as shown in FIG. 1, the application end 144 of the brush head 130 can taper towards the ferrule 120 from a center 146 of the application end 144 to an outer edge 148 of the application end 144. As such, the application end 144 can be a non-flat, substantially convex application end 144. In other aspects, each of the plurality of brush fibers 140 can define about the same length, and thus, the application end 144 can be substantially flat. In still other aspects, the application end 144 can be concave. Other aspects of the application end 144 can define any other suitable profile. Furthermore, in other example aspects of the cosmetic brush 100, the brush head 130 may not comprise the brush fibers 140, and instead can comprise a sponge, silicone, gel silicone, plastic, mesh, nylon flocking, or the like.

Figure 2:
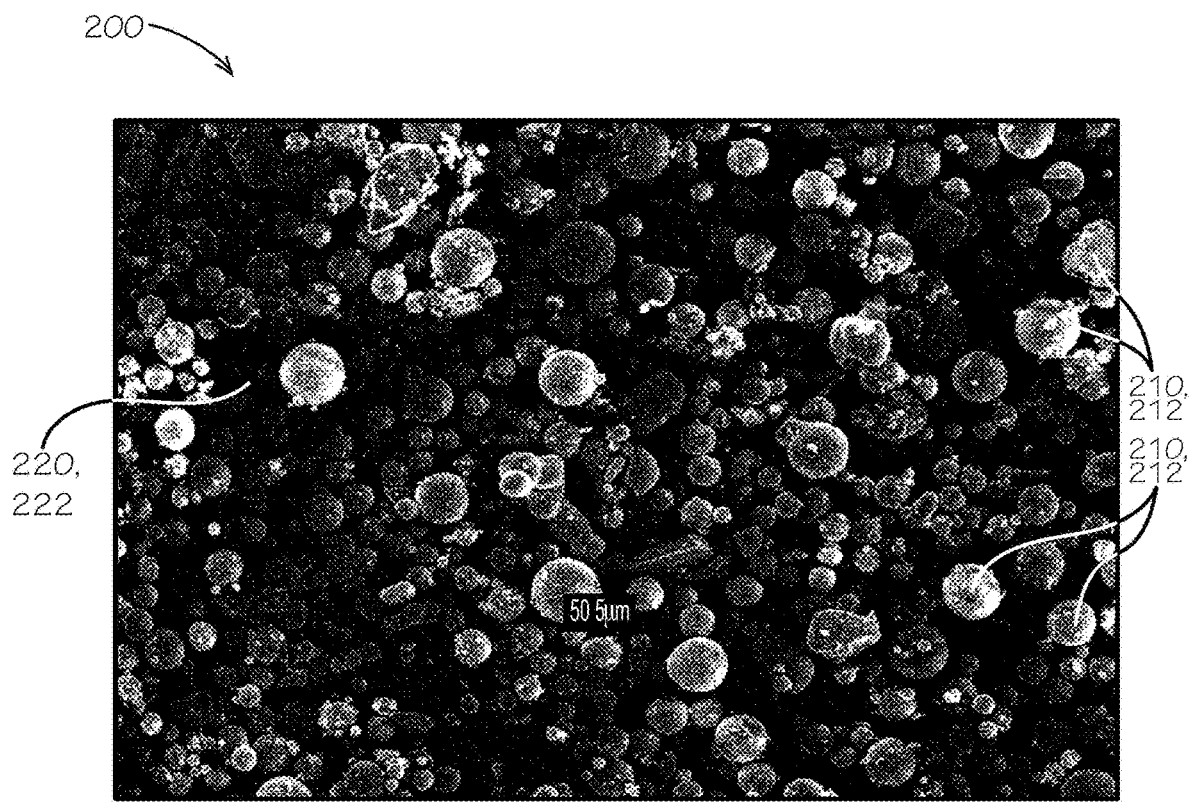
FIG. 2 is a close-up view of a mixture that can be applied to the brush fibers of FIG. 1.

Referring to FIG. 2, example aspects of the mixture 200 can comprise one or more particles 210 of a substance, such as a mineral, that can exhibit beneficial skincare properties. Beneficial skincare properties can include, for example, anti-microbial, anti-bacterial, anti-inflammatory, anti-aging, moisturizing, cleansing, skin soothing, and skin softening properties, and any other beneficial skincare properties known in the art. For example, in one aspect, the particles 210 can comprise one or more crystal particles 212. The one or more crystal particles 212 can be mixed with another substance, such as a resin-based substance, to form the mixture 200. Example aspects of the crystal particles 212 can comprise, for example, amethyst, rose quartz, citrine, or another crystal known in the art, or any combination thereof, that are known to have qualities that can promote improved skincare. Improved skincare can include the improved application of cosmetics, improved health and/or appearance of a user's skin, and other like improvements.

According to example aspects, certain crystals can comprise anti-microbial, anti-bacterial, and/or anti-inflammatory properties. These properties can aid in reducing the amount of bacteria that may be transferred from the cosmetic brush 100 to the user's skin during the application of cosmetics. Certain crystals can further can aid in toning and/or firming the user's skin, and may also comprise additional beneficial properties. In some aspects, the mixture 200 can comprise additional or alternative substances having beneficial skincare properties. For example, the mixture 200 can comprise gold, silver, pearl, copper, bamboo, charcoal, green tea, collagen, aloe, vitamin C, or any other mineral, precious metal, or substance known to have qualities that can be beneficial in skincare applications, or any combination of such substances. For example, green tea can aid in treating oily skin, clearing pores, and reducing redness and signs of aging. As another example, aloe can aid in treating dry skin and can be anti-inflammatory. According to example aspects, the particles 210 can be micron-sized particles, as described in further detail below.

According to example aspects, the one or more crystal particles 212, or other particles 210 of another substance providing beneficial skincare properties, can define an average diameter of between about 2.5 μm (micrometers) and 10 μm (micrometers). Put another way, the particles 210 can define a mesh size of between about 5000 U.S. mesh and about 1250 U.S. mesh. In a particular aspect, the crystal particles 212 can define an average diameter of about 6.5 μm, or about 2000 U.S. mesh. The particles 210, such as the crystal particles 212, having a diameter of at least about 6.5 μm can be large enough to absorb makeup powders and/or other cosmetics applied to the brush head 130. In another aspect, wherein the particles 210 can be plant-based particles, such as aloe particles, the particles 210 can define a mesh size of between about 500 and 1000 U.S. mesh. In still another aspect, wherein the particles 210 can be stone particles and/or metal particles, the particles 210 can define a mesh size of at least about 2000 U.S. mesh.

According to example aspects, a method of manufacturing the brush fibers 140 can comprise grinding a crystal (not shown) into one or more crystal particles 212 having a diameter of at least about 6.5 μm and idling an uncoated brush fiber (not shown) in a mixer (not shown) containing the grinded crystal particles 212 for approximately 60 (sixty) minutes at a temperature of at least about 70 degrees Celsius. In the present aspect, the crystal particles 212 can have about 1 (one) weight percent. Idling the uncoated brush fiber in the mixer can be performed while maintaining an interior of the mixer at a temperature of at least about 70 (seventy) degrees Celsius or at least about 158 (one hundred fifty eight) degrees Fahrenheit. The method can further comprise introducing a resin 220 into the mixer, wherein the resin 220 and crystal particles 212 together can define a liquid mixed material. In the present aspect, the resin 220 can have about 96 (ninety six) weight percent, and In some example aspects, the resin 220 can be a plastic resin 222. The mixer can then be agitated and heated, such that the mixed material, comprising the plastic resin 222 and crystal particles 212, within the mixer are agitated and heated.

In some aspects, the resin 220 and the particles 210 can form the mixture 200 after being agitated and heated. However, according to other example aspects, a dispersing agent (not shown) can be added into the mixed material to enhance the mixed material at about 10 (ten) minutes to about 20 (twenty) minutes after the agitation. In the present aspect, the dispersing agent can have about 3 (three) weight percent. Furthermore, in some example aspects, the dispersing agent can be a wax-based dispersing agent. The mixer can then be further heated for about 1 (one) hour to form the mixture 200 comprising the plastic resin 222, the wax-based dispersing agent, and the crystal particles 212. The mixture 200 can coat the uncoated brush fiber to provide the coated brush fiber 140. In example aspects, the coated brush fiber 140 can then be extruded with an extruder (not shown) while maintaining a temperature between about 250 (two hundred fifty) and about 280 (two hundred eighty) degrees Celsius, or about 482 (four hundred eighty two) and about 536 (five hundred thirty six) degrees Fahrenheit. A next step can comprise cutting the coated brush fiber 140 to a desired length. The cut and coated brush fiber 140 can then be implanted into the cosmetic brush 100 (shown in FIG. 1). For example, in some aspects, the cut and coated brush fiber 140 can be attached to the ferrule 120 (shown in FIG. 1). To form the full brush head 130 (shown in FIG. 1), a plurality of the brush fibers 140 can be attached to the ferrule 120, as shown. However, in other aspects, the plurality of brush fibers 140 can be attached directly to the handle 350 (shown in FIG. 3).

According to example aspects, the particles 210 having beneficial skincare properties, such as the crystal particles 212, can be electrolyzed using static electricity or other methods known in the art to achieve the desired size of the particles 210. Various equivalents, such as electrolysis, chemical decomposition, and photochemical reduction can alternatively be used to achieve the desired size of the crystal particles 210. In example aspects, the crystal particles 212 or other particles 210 can be subjected to a filter in order to purge particles 210 falling outside of a desired size range. For example, in a particular aspect, the filter can be configured to retain particles 210 having a diameter of at least about 6.5 μm, and any smaller particles 210 can pass through the filter to be expunged. Moreover, the dispersing agent, such as the wax-based dispersing agent, can be introduced at a suitable time to minimize the evaporation of moisture while the crystal particles 212 contained in the liquid mixed material are being rotated and agitated. Moreover, the resin 220 can be synthetic or plant-based. Example aspects of the resin 220 can comprise polyethylene terephthalate (PET), Polybutylene terephthalate (PBT), trimethylene terephthalate (PTT), polylactic acid (PLA), polybutylene succinate (PBS), nylon, polymers, copolymers, variant resins, or any other suitable substance or combination thereof. In some aspects, the resin 220 can further be mixed with an additive, such as a colorant, to provide additional features or properties to the brush fibers 140, such as a desired color.

As described above, the resulting cut and coated brush fibers 140 can be attached to the brush body 110, such as the ferrule 120 or the handle 350 to form the cosmetic brush 100. The cosmetic brush 100 can then be used in the application of makeup powders or other cosmetics to the skin. In one aspect, the cosmetics can be applied directly to the application end 144 (shown in FIG. 1) of the cosmetic brush 100, and the user can engage the application end 144 with their skin to apply and blend the cosmetics therewith. In another aspect, the user can apply the cosmetics directly to their skin, and can rub the application end 144 of the cosmetic brush 100 against the skin to blend the cosmetics therewith. The cosmetic brush 100 having the cut and coated fibers 140 subjected to the manufacturing method described above can inherit the multiple benefits of the incorporated crystal particles 212 and/or the other minerals or substances having beneficial skincare properties. Furthermore, the particles 210, for example, the crystal particles 212, that having a diameter of at least about 6.5 µm can absorb powder-based makeups and/or other cosmetics without the risk of permeating through the outer layers of a user's skin.

Figure 3:
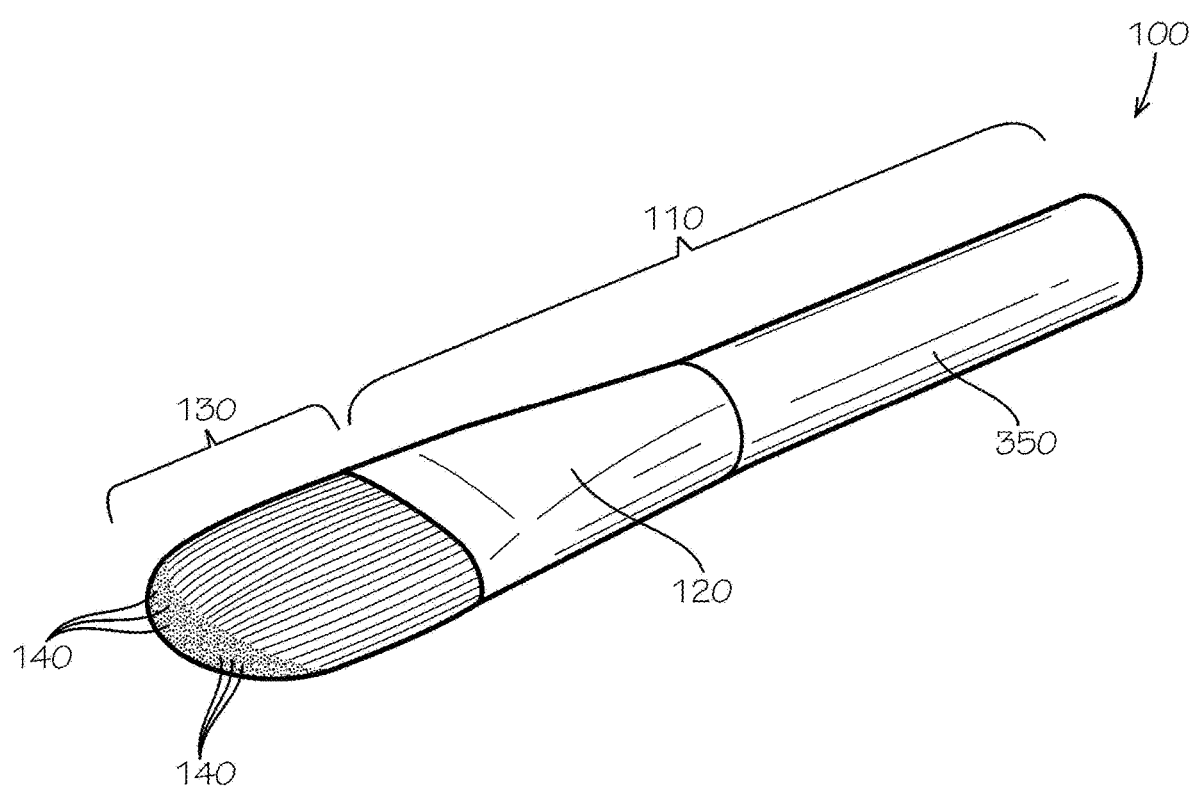
FIG. 3 is a top perspective view of the cosmetic brush, in accordance with another aspect of the present disclosure.

FIG. 3 illustrates another example aspect of the cosmetic brush 100. Similar to the cosmetic brush 100 of FIG. 1, the cosmetic brush 100 of the present aspect can comprise the brush body 110 and the brush head 130. The brush head 130 can comprise a plurality of the cut and coated brush fibers 140. In example aspects, the brush body 110 can comprise the ferrule 120 for receiving the brush fibers 140. As shown, the brush body 110 can further comprise a handle 350 attached to the ferrule distal to the brush head 130. Example aspects of the handle 350 can be formed from a metal material. Other example aspects of the handle 350 can be formed from a plastic material, or any other suitable material known in the art or combination thereof. The handle 350 can be configured to be gripped by a user during the application and/or blending of cosmetics with the cosmetic brush 100.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method for manufacturing a coated brush fiber comprising:
   idling an uncoated brush fiber in a mixer containing crystal particles;
   introducing a resin into the mixer;
   heating and agitating the resin and crystal particles within the mixer to form a mixture; and
   coating the uncoated brush fiber with the mixture to form a coated brush fiber;
   wherein the method further comprises introducing a dispersing agent into the mixture to enhance the mixture after heating and agitating the resin and crystal particles and before coating the uncoated brush fiber with the mixture.

2. The method of claim 1, wherein each of the crystal particles defines a diameter of at least about 6.5 µm.

3. The method of claim 1, wherein the resin is a plastic resin.

4. The method of claim 1, wherein idling the uncoated brush fiber in the mixer containing crystal particles comprises idling the uncoated brush fiber in the mixer containing crystal particles for about 60 minutes.

5. The method of claim 1, wherein idling the uncoated brush fiber in the mixer containing crystal particles comprises idling the uncoated brush fiber in the mixer containing crystal particles at a temperature of at least about 70 degrees Celsius.

6. The method of claim 1, wherein introducing the dispersing agent into the mixture to enhance the mixture is performed at about 10 to 20 minutes after heating and agitating the resin and crystal particles.

7. The method of claim 6, wherein the dispersing agent is a wax-based dispersing agent.

8. The method of claim 6, wherein the mixture can be heated for about 60 minutes at a temperature of at least about 70 degrees Celsius after introducing the dispersing agent into the mixture.

9. The method of claim 1, further comprising extruding the coated brush fiber at a temperature between about 250 and 280 degrees Celsius.

10. The method of claim 1, further comprising cutting the coated brush fiber to a desired length.

11. The method of claim 1, further comprising attaching the coated brush fiber to a brush body to form a cosmetic brush.

* * * * *